United States Patent [19]

Marchant et al.

[11] 4,093,879

[45] June 6, 1978

[54] MAGNETOHYDRODYNAMIC ELECTRODE

[75] Inventors: David D. Marchant, Richland, Wash.; Don H. Killpatrick, Orland Park, Ill.

[73] Assignee: The United States of America as represented by the United States Department of Energy, Washington, D.C.

[21] Appl. No.: 773,360

[22] Filed: Mar. 1, 1977

[51] Int. Cl.$^2$ .............................................. H02N 4/02
[52] U.S. Cl. ...................................................... 310/11
[58] Field of Search ........................................... 310/11

[56] References Cited

U.S. PATENT DOCUMENTS

| 3,149,253 | 9/1964 | Luebke | 310/11 |
| 3,274,408 | 9/1966 | Louis | 310/11 |
| 3,280,349 | 10/1966 | Brenner et al. | 310/11 |
| 3,430,082 | 2/1969 | Yerouchalmi | 310/11 |
| 3,454,798 | 7/1969 | Yerouchalmi | 310/11 |
| 3,531,421 | 9/1970 | Foex et al. | 310/11 X |
| 3,574,144 | 4/1971 | Yerouchalmi | 310/11 X |

Primary Examiner—Donovan F. Duggan
Attorney, Agent, or Firm—Dean E. Carlson; Frank H. Jackson; James W. Weinberger

[57] ABSTRACT

An electrode capable of withstanding high temperatures and suitable for use as a current collector in the channel of a magnetohydrodynamic (MHD) generator consists of a sintered powdered metal base portion, the upper surface of the base being coated with a first layer of nickel aluminide, an intermediate layer of a mixture of nickel aluminide - refractory ceramic on the first layer and a third or outer layer of a refractory ceramic material on the intermediate layer. The sintered powdered metal base resists spalling by the ceramic coatings and permits greater electrode compliance to thermal shock. The density of the powdered metal base can be varied to allow optimization of the thermal conductivity of the electrode and prevent excess heat loss from the channel.

11 Claims, 4 Drawing Figures

MAGNETOHYDRODYNAMIC ELECTRODE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to an electrode. More specifically, this invention relates to a high-temperature-resistant electrode for use as a current collector in the channel of a magnetohydrodynamic generator.

In a magnetohydrodynamic power generator, heat is utilized to produce a high-velocity stream of electrically conducting fluid or plasma which is passed through a magnetic field to convert the kinetic energy of the stream into electrical energy. A typical diagonal window frame MHD power generator is an elongated duct or channel constructed of a large number of open rectangular forms or "window frames" fastened together side by side, insulated from each other and cooled by a liquid passing through coolant channels in each frame. Around the inner perimeter of each frame are attached, generally by brazing, a number of individual, generally rectangular, electrodes for collecting the electrical energy generated in each frame by the passage of the high-temperature conductive fluid through the magnetic field. Other generator geometries can also be used, but in each case a number of electrodes are present and separated from each other by an electrical insulation since some will act as anodes and some as cathodes as the plasma passes through the channel perpendicular to the longitudinal axis of the electrodes.

The environmental conditions within an operating channel in which the electrodes must function are very severe, and strenuous physical demands are placed on these electrodes. The plasma, which may be either ionized gas or an inert gas seeded with a conductor such as potassium, may reach temperatures up to 2800° C, while the surface of the electrodes may reach about 2000° C. However, since the window frames to which the electrodes are attached are generally of copper, the electrode-frame temperatures can be no more than about 600°–1000° C. Thus, the electrodes must be capable of withstanding a temperature differential between electrodeplasma interface and the electrode-frame interface of up to about 1400° C. It is important that the thermal conductivity of the electrodes be controlled so that the heat loss from the plasma through the electrodes to the frames is not too great. Minimizing the temperature differential within the plasma between the plasma core and the electrodeplasma interface increases the energy conversion efficiency. The electrode must be able to withstand erosive forces since the plasma as it passes through the duct may approach or even exceed sonic velocity. The electrode must either be protected from oxidation or be prepared of oxidation-resistant materials since many plasmas, depending upon the particular fluid and its source, are slightly oxidizing at operating temperatures. Finally, due to the possibility of generator malfunction, the electrodes must be able to withstand the thermal shock of sudden heating or cooling without the electrode separating from the channel or without the upper high-temperature erosion-resistant layers spalling from the remainder of the electrode. Thus it is a problem to find a material or materials from which electrodes can be made which can withstand the rigors of such an environment. U.S. patent application Ser. No. 745,942, filed November 29, 1976 and assigned to the common assignee, describes an MHD electrode and electrode system which meets many but not all of the hereinbefore-enumerated problems.

SUMMARY OF THE INVENTION

We have developed an electrode which meets most of the problems enumerated above and which provides a method for controlling the thermal conductivity of the electrodes. The high-temperature-resistant electrode of our invention consists of a base portion of sintered powdered metal of predetermined density having a lower surface for attaching the electrode to the MHD channel, two parallel side walls, one being the upstream wall and one being the downstream wall with respect to the flow of the plasma through the channel, and an upper surface parallel to the lower surface, a first layer of nickel aluminide on the upper surface, an intermediate layer consisting of a mixture of nickel aluminide and a refractory ceramic material on the first layer, and an outer layer of a refractory ceramic material on the intermediate layer, while both side walls are coated with an outer layer of electrically insulating refractory ceramic material. In alternative embodiments, either the upstream side wall alone or both side walls may be coated with the first intermediate layer and upper layer under the insulating material or the downstream wall and base may be coated with a layer of copper to improve electrode cooling.

The electrode of this invention has several advantages over prior art electrodes. For example, by varying the density of the sintered powdered metal base, it is possible to vary the thermal conductivity of the electrode and hence this makes it possible to control the heat loss of the plasma through the electrode to the cooled channel frame. In this same manner, by reducing the thermal conductivity of the electrodes located at the downstream or cooler end of the channel, it is also possible to maintain a more even temperature through the length of the MHD channel. Another advantage of controlling thermal conductivity is that the electrodes can the thinner so that they project into the channel less than some electrodes, thereby allowing a greater volume of plasma to flow through the duct, improving generator efficiency. Also important is that the porous base permits the electrode to be more compliant when subjected to stresses caused by steep temperature gradients within the channel, thereby reducing both the chance of the electrode separating from the channel, and of the ceramic coatings spalling from the base. Spalling is also reduced because adhesion is improved between the metal base and the ceramic coating because of the porosity.

It is therefore one object of the invention to provide an improved electrode for use as a current collector in an MHD generator.

It is another object of the invention to provide an improved electrode for use in the channel of an MHD generator which will reduce the heat loss from the plasma to the channel frames.

It is still another object of the invention to provide an improved electrode for use in an MHD generator in which the thermal conductivity of the electrode can be controlled.

It is a further object of the invention to provide an improved electrode for an MHD channel which is generally thinner than electrodes presently being used.

Finally, it is the object of the invention to provide an improved electrode for an MHD generator channel which is compliant and better able to withstand thermal stresses without separating from the channel and without the electrode ceramic spalling from the electrode base.

DETAILED DESCRIPTION OF THE PREFERRED EMBODIMENT

Figure 1:
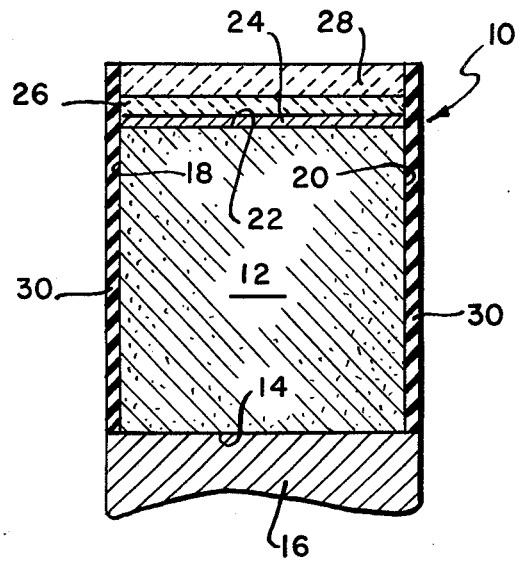
FIG. 1 is a cross-sectional view of the preferred embodiment of the electrode of the invention, shown mounted on a frame.

Referring to FIG. 1, the electrode 10 of the invention consists of a base portion 12 of sintered powdered stainless steel and has a lower surface 14 by which it is mounted on the inner perimeter of frame 16, first and second parallel perpendicular side walls 18 and 20, respectively, and upper surface 22 parallel to the lower surface 14. The upper surface 22 of base 12 is coated with a thin first layer 24 of nickel aluminide, about 5 mils thick, which is in turn coated with intermediate layer 26 of about 50% nickel aluminide and 50% refractory ceramic material, about 10 mils in thickness and which is in turn coated with outer or face layer 28 of refractory ceramic material 25 to 40 mils in thickness. First and second side walls 18 and 20 are each covered with a 10 to 20 mils thick layer of refractory electrical insulative material 30 to complete the electrode.

The sintered base portion 12 of electrode 10 may be prepared of powders of metals or alloys which are electrically conductive, have a melting point above about 1000° C, are nonferromagnetic, and, due to the oxidation potential of the environment, have at least some degree of oxidation resistance. The preferred metals are the 300 series stainless steels such as 304 and 310 and Hastelloy B ® all of which have a thermal expansion coefficient similar to that of the ceramics. Other metals suitable for use as the electrode base include the refractory metals and alloys of the refractory metals such as tungsten, molybdenum, niobium, tantalum, the nickel-based alloys of chromium and molybdenum which include Hastelloy B ® and X and Inconel 600 ®, the cobalt-based alloys, and the noble metals. While not critical, a powder size from −100 to +400 U.S. Standard mesh was found to provide the good adhesion and void fraction control.

Density of the base will depend upon the amount of thermal conductivity desired in the electrode and may ary from about 60 to about 100 volume percent of the theoretical density of the metal, the preferred range being about 70 to 90 volume percent. For example, it may be determined that in the hot end of a given MHD channel, a base density of about 90 volume percent will provide sufficient thermal conductivity to maintain the temperature of the face of the electrode at an optimum temperature of 2000° C, while at a density of 95%, the face temperature would be 1900° C, resulting in an undesirable heat loss from the plasma. It may also be determined that, in the cold or outlet end of the same channel, an electrode density of only 70 volume percent may provide adequate thermal conductivity to maintain the electrode face at the optimum temperature. Thus heat loss from the plasma to the electrodes is minimized, efficiency is maintained, and the electrodes operated at an efficient temperature.

The first layer 24 on the upper surface of the base portion is high-temperature, oxidation-resistant, nonferromagnetic metal or alloy which will adhere to the sintered powdered metal base, and which can be mixed with the refractory ceramic to provide an intermediate layer which would then provide an adherent interface for the ceramic outer layer. Excellent results were obtained with nickel aluminide which has a composition range of 50 to 80 weight percent nickel and 20 to 50 weight percent aluminum. Similar compounds may substitute chromium for either the nickel or the aluminum. The coating, which may vary from about 1 to 10 mils, preferably 4 to 6, in thickness, is used as a surface coating on the sintered metal base and is intended along with layer 26 to provide better adhesion of the refractory ceramic to the base and to prevent spalling under extreme operating conditions.

The intermediate layer 26 may vary from about 5 to 25, preferably 10 to 20, mils in thickness and is a mixture of 25 to 75 weight percent nickel aluminide and 25 to 75 weight percent of a refractory ceramic material, preferably about 50 weight percent of each. It is preferable, although not required, that the refractory ceramic material of the intermediate layer 26 be the same material as the refractory ceramic of outer layer 28.

Outer layer 28 may vary from 10 to 100, preferably 20 to 40, mils in thickness, is formed only of refractory ceramic material and provides the interface between electrode 10 and the hot plasma passing through the channel.

The refractory ceramic may be any material that is capable of withstanding a temperature of up to about 2000° C under a partial pressure of oxygen which may be up to $10^{-3}$ atmospheres, is corrosion and erosion-resistant and is electrically conductive at temperatures above about 1200° C. The preferred ceramics include stabilized zirconia and hafnia and spinel doped with 10 to 50 mole percent iron or chromium to improve electrical conductivity. Less important but also useful are yttria and lanthanum-chromite doped with 2 to 10 mole percent strontium. It is important that the zirconia and hafnia be at least partially stabilized by the addition of from 1 to 60 mole percent (m/o), generally 5 to 10 m/o, yttria, ceria, neodymia, praseodymia, calcium oxide or magnesium oxide to prevent potentially destructive volume changes which accompany crystalline transformation during heating and to improve electrical conductivity. For example, hafnia might contain about 1 to 10 m/o, preferably 8 to 10 m/o, yttria to prevent phase changes, and 2 to 12 m/o, preferably 6 to 10 m/o, ceria to enhance electrical conductivity.

The refractory insulative material applied to the sides and ends of each electrode must be a material which is electrically nonconductive at MHD channel operating temperatures, such as magnesia, alumina, magnesia-alumina spinel, strontium zirconate or a calcium zirconate. Preferably, the insulation is a 5 to 25 mil thick layer of spinel which is applied to both side walls and the ends of the electrode either by plasma spraying or by applying the insulation as a monolithic piece.

The electrodes may be prepared by any convenient method; for example, the sintered powdered metal base portion of the desired density and size is first prepared by hot-pressing and sintering the metal powder. The appropriate first, intermediate and top layers are then applied in appropriate order to the base by plasma or flame spraying to achieve the desired thickness. The electrode is then completed by application of the ceramic insulative material to each side to prevent adjacent electrodes in an assembly from grounding each other.

The electrodes may be fabricated in a variety of shapes and cross sections as required by MHD geometry, but generally will be square or rectangular in cross section with a generally rectangular or parallelepipedal shape.

Figure 2:
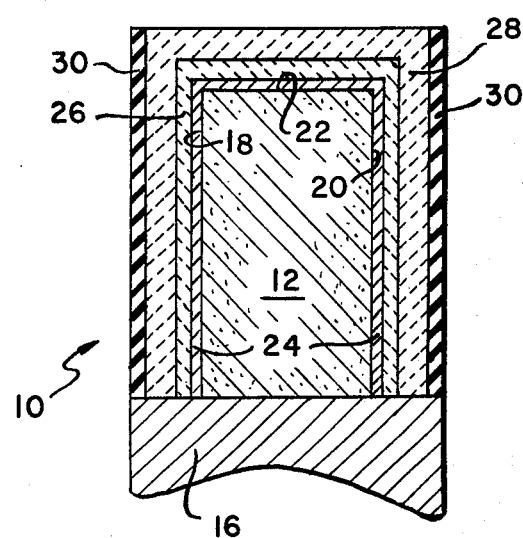
FIGS. 2-4 are cross-sectional views of other embodiments of the electrode of the invention, also shown mounted on a frame.

Referring now to FIG. 2, the first, intermediate and outer layers, 24, 26 and 28, respectively, extend over the top surface 18 of base 12 to first and second side walls 18 and 20, respectively, while the sides of the outer layers are coated with a refractory ceramic insulation 30. Note that it is preferable that the bottom edges of each of the three layers on each side of the base portion and the bottom edge of insulation 30 should contact frame 16 to provide better electrode cooling.

Figure 3:
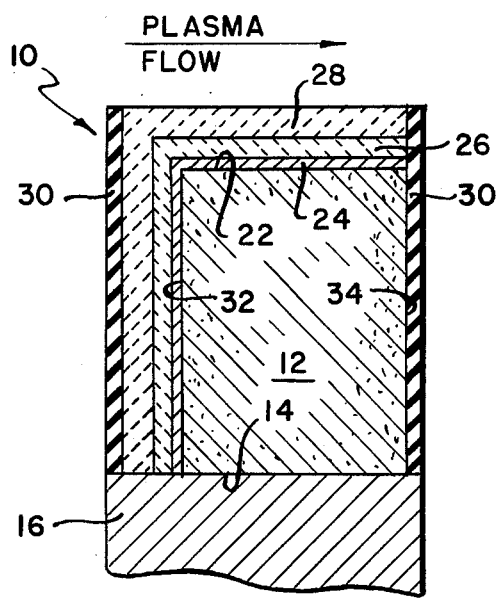

The placement of current-collecting electrodes in MHD channels is such that the axis of the electrode is perpendicular to the direction of the flow of the plasma. Referring now to FIG. 3, the direction of plasma flow is shown from left to right so that first side wall 18 of electrode 10 now becomes the upstream side wall 32 and second side wall 20 becomes downstream side wall 34, both with respect to the direction of plasma flow in an MHD generator channel. Thus, as shown, the first, intermediate and outer layers 24, 26 and 28, respectively, cover not only upper face 22 but upstream side wall 34 as well, while the outer face 28 on wall 32 and downstream wall 34 are also coated with ceramic electrical insulation 30. As shown, it is preferable that the lower edges of the covering layers 24, 26 and 28 and insulation 30 contact frame 16.

Figure 4:
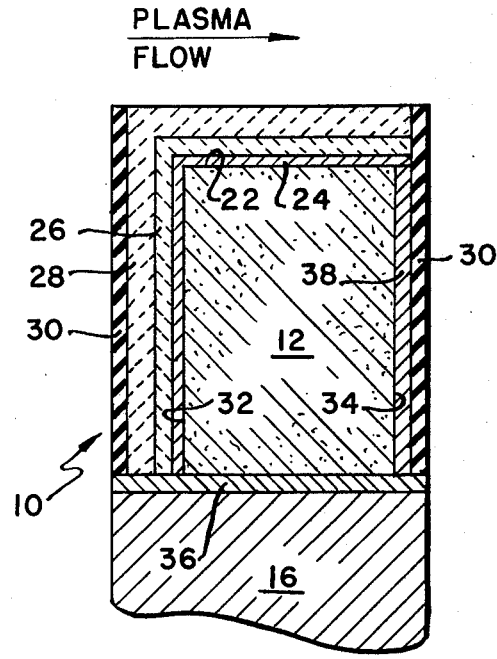

The electrode shown in FIG. 4 is attached to intermediate mounting plate 36, which is a metal having good thermal conduction properties such as copper, so that the bottom edges of the layers and the insulation on the upstream side wall 32 of the electrode are in contact with the plate. The downstream side wall 34 is also covered with a thermal conductive layer 36 which may be of copper or other highly thermally conductive material, the lower edge contacting intermediate plate 36 for improved thermal conductivity, the upper edges extending just to the top of base 12, to contact lower layer 24. Insulative layer 30 covers the entire downstream side wall from the edge of outer layer 28 to intermediate plate 36.

EXAMPLE

A number of electrodes were fabricated and tested in the following manner. The electrode bases were fabricated by placing −325 mesh 310 stainless steel powder in a cylindrical mold and pressing at 25,000 psi. The pressed powder was then vacuum-sintered at 1120° C for 5 hours, resulting in a density of about 70% of theoretical. The sintered cylinders were then machined to rectangular bases 0.250 inch × 0.375 inch × 3 inch long. The sintered and machined bases were then washed in both acetone and detergent in preparation for plasma spraying. The bases were roughened by grit blasting before each successive layer was applied by plasma spraying the surfaces using a 40 KW Plasmadyne $^R$ spray gun which was hand held using a string guide. The coating layer thicknesses were measured at the completion of each coating application, before the next layer was applied.

The electrodes as completed were similar to the electrode shown in FIG. 1. The upper faces were coated with a layer of 6% aluminum with a nickel-chromium alloy balance (METCO 443) which varied from 0.0066 to .0091 inches, the intermediate layers were a mixture of 50 weight percent nickel-chromium-aluminide and 50 weight percent yttria stabilized zirconia from 0.0340 to 0.044 inches, while the face layers were 0.0425 to 0.0509 inches yttria stabilized zirconia, METCO 202 NS (20 mole percent $Y_2O_3$ − 80 mole percent $ZrO_2$). Monolithic insulators were applied to both sides of the electrode. The insulators were 0.075 inches thick of magnesia-alumina spinel.

The electrodes were tested in a dynamic test facility. The facility consists of a combustor for burning liquid hydrocarbons such as kerosene or isopropanol, a nozzle, a channel and a throttle throat. A hot potassium seeded plasma at a temperature of about 3000° K is generated in the combustor. The plasma is forced through the nozzle, resulting in a plasma velocity in the channel of 800 m/sec. The electrodes were placed in the rectangular cross section channel opposite each other — two electrodes as anodes and two as cathodes, separated by interelectrode insulators. An external power supply is used to establish an electrical field and apply a current density of 1.5 amps/cm$^2$ to the electrodes. The test consists of heating the electrodes and insulators to operating conditions, running for periods of time and cooling the electrodes to ambient conditions. In each test, the facility developed some problems, resulting in emergency shutdowns where the combustor is instantaneously shut down and the electrodes are rapidly cooled to ambient conditions.

The electrodes in one assembly were severaly damaged after only 8 hours and 45 minutes of operation. It is believed that the damage at least partially resulted from inadequate cooling and misalignment in the channel. The electrodes and insulation in two other assemblies performed satisfactorily after being exposed to several emergency shutdowns and several hours under operating conditions, where the electrode-plasma interface temperature reached 2000° K. The heat flux in the electrodes was less than 120 watts/cm$^2$. The ceramic coating adhered well to the stainless steel base and minimum undesirable seed penetration was noted.

The embodiments of the invention in which an exclusive property or privilege is claimed are defined as follows:

1. An electrode for use in a magnetohydrodynamic generator comprising:
    a base portion of sintered powdered metal having a predetermined density, the base having a lower surface for attaching the electrode to a magnetohydrodynamic generator, two parallel side walls and an upper surface;
    a first layer of nickel aluminide on the upper surface;
    an intermediate layer of nickel aluminide and refractory ceramic on the first layer, the refractory ceramic being electrically conductive at MHD operating temperature; and
    an outer layer of refractory ceramic on the intermediate layer, the refractory ceramic being electrically conductive at MHD operating temperatures.

2. The electrode of claim 1 wherein the side walls are coated with a layer of refractory ceramic electrical insulating material.

3. The electrode of claim 2 wherein the base is prepared of an electrically conductive, nonferromagnetic, oxidation-resistant metal or alloy melting above 1000° C.

4. The electrode of claim 3 wherein the density of the base is from 60 to about 100% of the theoretical density.

5. The electrode of claim 4 wherein the refractory ceramic is selected from the group consisting of stabilized zirconium oxide, stabilized hafnium oxide, iron-doped spinel, chromium-doped spinel, yttrium oxide and strontium-doped lanthanum chromite.

6. The electrode of claim 5 wherein the sintered powdered metal is selected from the group consisting of stainless steel, niobium, hafnium, tantalum, molybdenum, and alloys of niobium-zirconium, hafnium-tantalum, nickel-chromium and nickel-molybdenum.

7. The electrode of claim 6 wherein the intermediate layer consists of 25 to 75 weight percent nickel aluminide and 25 to 75 weight percent refractory ceramic.

8. The electrode of claim 7 wherein the refractory ceramic electrical insulating material is selected from the group consisting of spinel, magnesium oxide, alumina, strontium zirconate or calcium zirconate.

9. The electrode of claim 1 wherein the first, intermediate and outer layers extend over the two side walls and the outer layers on the side walls are coated with a layer of refractory ceramic electrical insulating material.

10. The electrode of claim 1 wherein the two side walls consist of an upstream side wall and a downstream side wall relative to the plasma flow in an MHD generator, the first, intermediate and outer layers extend over the upstream side wall and the outer layer on the upstream side wall and the downstream side wall are coated with a layer of refractory ceramic electrical insulating material.

11. The electrode of claim 10 wherein the base of the electrode is attached to an intermediate mounting plate of copper, the bottom edges of the first, intermediate and outer layers and the refractory insulating material on the upstream side contact the mounting plate, the downstream side wall of the electrode contains a layer of copper and an outer layer of refractory ceramic electrical insulating material, the bottom edges of the copper layer and the refractory ceramic contact the mounting plate.

* * * * *